United States Patent Office 3,344,252
Patented Sept. 26, 1967

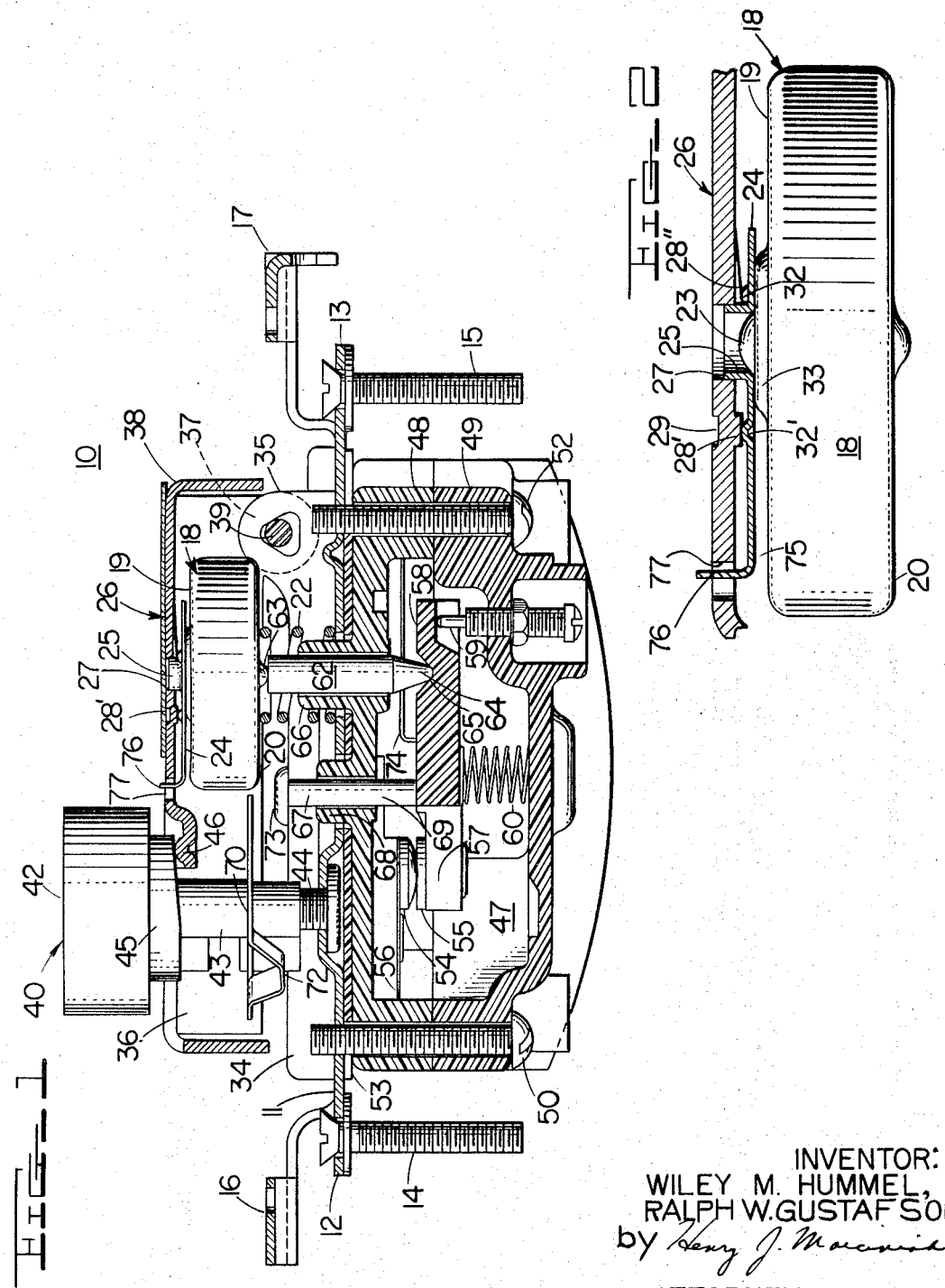

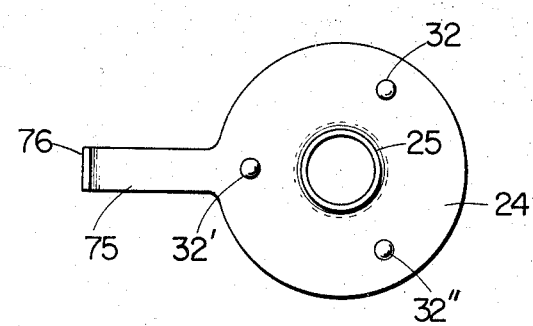
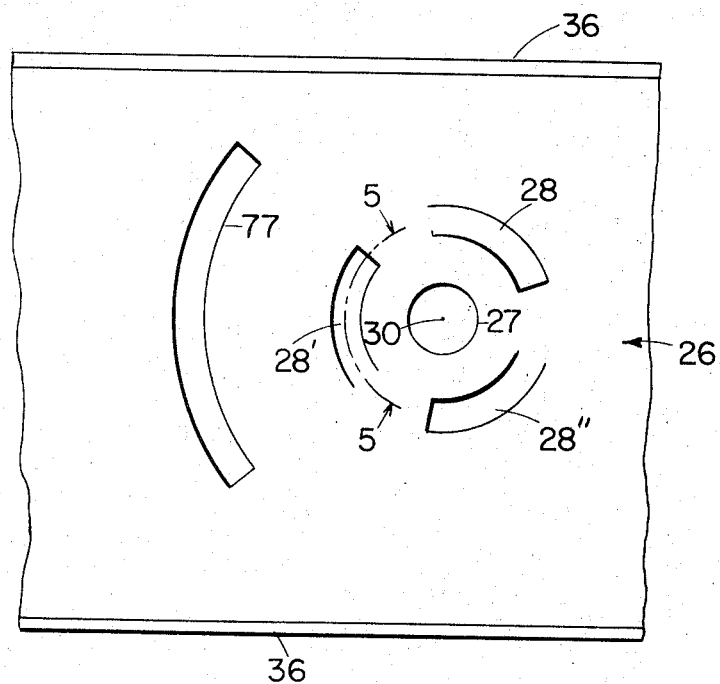
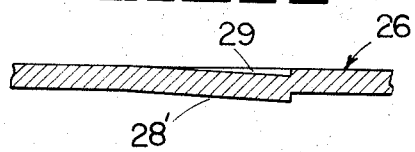

3,344,252
THERMOSTATIC DEVICE WITH COMPENSATION FOR INTERNAL HEAT
Wiley M. Hummel, Prophetstown, and Ralph W. Gustafson, Morrison, Ill., assignors to General Electric Company, a corporation of New York
Filed Feb. 4, 1966, Ser. No. 525,250
7 Claims. (Cl. 200—140)

ABSTRACT OF THE DISCLOSURE

A thermostat has a thermally responsive diaphragm for actuating switch contacts and a manually operated control disc for varying the temperature at which the diaphragm actuates the switch contacts. An adjustment disc is provided, operable independently of the control disc to compensate for heat generated within the thermostat which otherwise may vary the control point of the diaphragm as much as 12° F.

---

This invention relates generally to thermostatic devices, such as room thermostats, for controlling the temperature of a room or other enclosure, and more particularly to a thermostatic device having compensation for internally generated heat.

Thermostats responsive to both ambient and radiant heat are commonly used in conjunction with electric heating systems, such a thermostat being shown in Patent No. 3,121,151 to Stanley R. Mitick, Jr. and assigned to the assignee of the present application. Such thermostats conventionally include switch contacts coupled directly in the circuit of the electric heating elements and thus handle the load current. The resultant relatively high current flow in the switch contacts of the thermostat and in the circuit elements connected thereto within the enclosure of the thermostat generates appreciable internal heat which affects the temperature responsive element. Under certain conditions this current flow may result in an excessive "droop" or lowering of the control point of the thermostat.

With the thermostat continuously in operation, the "droop" has been found to change nearly linearly with the size of the load. For example, the control point was found to vary as much as 12° Fahrenheit with a 5,000 watt load as compared to no variation at zero load. Obviously, such internal heating therefore may result in erroneous thermostat operation, in that the temperature responsive element will actuate the switch contacts to terminate heating at an ambient temperature lower than that called for by the temperature setting control. It is therefore desirable to provide a thermostat including simple and readily available means for changing the calibration in accordance with the amount of the load to be controlled in order thereby to compensate for the "droop" due to internal heating.

Accordingly, it is an object of the invention to provide an improved thermostatic device incorporating means for compensating for internal heating.

A further object of the invention is to provide an improved room thermostat for an electric heating system incorporating supplemental mechanical means for compensating for internal heating of the temperature-sensing element.

The invention in its broader aspects provides a thermostatic device incorporating switch means for opening and closing the circuit and having circuit elements connected thereto. Temperature responsive actuator means is provided for actuating the switch means in response to a predetermined temperature and manually operated means is provided acting upon the actuator means for selectively varying the predetermined temperature. In order to compensate for heating of the actuator means due to current flow in the switching means and the circuit elements connected thereto, second manually operated means is provided acting upon the actuator means independently of the first manually operated means.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side cross-sectional view illustrating a room thermostat embodying the invention;

FIG. 2 is a fragmentary enlarged view, partly in cross-section, further illustrating the invention;

FIG. 3 is a top view of the manually adjustable disc of FIGS. 1 and 2;

FIG. 4 is a fragmentary bottom view of the temperature setting member of FIGS. 1 and 2 showing the cam surfaces thereon; and FIG. 5 is a fragmentary cross-sectional view taken along the line 5—5 of FIG. 4.

Referring now to the figures of the drawing, the improved room thermostat of the invention, generally indicated at 10, includes a base plate 11 upon which all of the operating elements of the thermostat are mounted. In the illustrated embodiment in which the thermostat 10 is adapted to be mounted in a conventional electrical outlet box (not shown), base plate 11 is provided with a pair of ears 12, 13 adapted to be secured to the flanges of the outlet box by means of screws 14, 15. Base plate 11 is also provided with flanges 16, 17 for mounting a decorative cover member (also not shown).

The actuator for the thermostat 10 is a conventional temperature-responsive diaphragm 18 which is a liquid filled, generally cylindrical sealed vessel having corrugated top and bottom sides 19, 20. In the illustrated arrangement, the bottom side 20 will expand downwardly in response to an increase in temperature and contract upwardly in response to a decrease in temperature. A coil spring 22 is provided having its upper end engaging the bottom side 20 of the diaphragm 18 and its lower end engaging the upper surface of the base plate 11 thus applying upward force on the diaphragm 18.

As is shown in FIG. 2 the top side 19 of the diaphragm 18 has a coaxial protuberance 23 formed thereon. A manually actuated temperature compensating disc 24 is provided having an upwardly extending cylindrical portion 25 formed thereon rotatably seated on the coaxial protuberance 23. A temperature-setting lever member 26 is provided having an opening 27 formed therein in which the cylindrical portion 25 of the disc 24 is seated for rotational and axial movement.

As best seen in FIGS. 2, 4 and 5, the bottom surface of lever member 26 has a plurality of cam surfaces 28, 28', and 28" formed thereon. In the illustrated embodiment, the cam surfaces 28, 28' and 28" are formed from the lever member 26 in a coining operation, as shown at 29 in FIGS. 2 and 5. The cam surfaces 28 are generally arcuate about the axis 30 of opening 27 and are thus coaxial with cylindrical portion 25 of disc 24 and with protuberance 23 and the diaphragm 18. Disc 24 has a corresponding plurality of projections 32 formed thereon which cooperatively engage the cam surfaces 28, the bottom surface of disc 24 engaging coaxial raised portion 33 on the top side 19 of the diaphragm 18 from which the protuberance 23 extends, as best seen in FIG. 2.

Base plate 11 has a pair of transversely spaced apart upwardly extending side flange portions 34 (only one of which is shown in FIG. 1) respectively having upwardly extending ears 35 at one end. Lever member 26 has a pair of transversely spaced apart downwardly extending side flange portions 36 respectively having a pair of downwardly extending ears 37 at one end. End 38 of lever member 26 is pivotally mounted on the base plate 11 by means of a pivot pin 39 extending through suitable openings in the corresponding pairs of ears 35, 37. It will now be seen that the coil spring 22 normally biases diaphragm 18, disc 24 and lever member 26 upwardly.

The predetermined operating temperature of the thermostat 10 is manually set by temperature setting control 40 comprising a manually actuated temperature-setting knob 42 secured to a vertically extending shaft 43 rotatably mounted on base plate 11 by means of a suitable screw 44. A cam 45 is secured to the shaft 43 and cooperatively engages a projection 46 on lever member 26. It will thus be seen that cam 45 acts on lever member 26, disc 24 and diaphragm 18 against the upward bias provided by coil spring 22; rotation of knob 42 and cam 45 in one direction will move lever member 26 downwardly, while rotation of knob 42 in the opposite direction will permit lever member 26 to move upwardly.

Switch assembly 47 is provided enclosed within mating housing parts 48, 49 secured to the base plate 11 by means of suitable screws 50, 52. A suitable sheet 53 of insulating material is desirably positioned between the upper housing part 48 and the base plate 11. Stationary and movable switch contacts 54, 55, respectively are provided with stationary contact 54 being secured to a conductor 56 and movable contact 55 being mounted on a pivoted armature member 57. End 58 of armature 57 is pivotally mounted on the lower housing part 49 by means of a suitable pivot pin 59 having a threaded engagement with the housing part 49, as shown. Armature 57 is biased upwardly to a position in which contacts 54, 55 are closed by a suitable coil spring 60.

Diaphragm 18 actuates armature 57 to open and close contacts 54, 55 by means of an operating pin 62 having its upper end engaging protuberance 63 extending downwardly from the bottom side 20 of the diaphragm 18 and having its lower end 64 seated in a recess 65 in the upper side of the armature 57. Operating pin 62 extends downwardly through a bearing sleeve portion 66 formed on the upper housing part 48 which extends upwardly through openings in the insulator 53 and the base plate 11 and partially into the interior of the coil spring 22 forming a seat therefor. Other features and mode of operation of the thermostatic device 11 are more fully described in the above-mentioned U.S. Patent Number 3,121,151 granted to S. R. Mitick, Jr. and assigned to the same assignee as the present application.

It will be seen that a predetermined amount of downward expansion of the bottom side 20 of the diaphragm 18 against the upward forces exerted by springs 22, 60 will cause the operating pin 62 to pivot armature 57 about pivot pin 59 thereby to open contacts 54, 55. Likewise, a predetermined amount of upward contraction of the bottom side 20 of the diaphragm 18 under the influence of spring 22 and also under the influence of spring 60 acting on armature 57 and in turn on operating pin 62 will result in upward pivoting of the armature 57 about the pivot pin 59, thereby to close contacts 54, 55.

Armature 57 is positively moved to its "contacts open" position in one extreme rotational position of control knob 42 by means of a pin 67 extending downwardly through a bearing sleeve 68 in the upper housing part 48, pin 67 having its lower end 69 engaging the upper surface of armature 57. Control shaft 43 has a disc 70 secured thereto which has a cam surface 72 formed thereon. In the aforesaid extreme rotational position of control knob 42, cam surface 72 of disc 70 engages the upper end 73 of pin 67, forcing it downwardly so that lower end 69 forces armature 57 downwardly thereby to open the contacts 54, 55. When control knob 42 is rotated away from the extreme position, thereby moving cam surface 72 away from end 73 of pin 67, spring 60 urges armature 57 upwardly thereby moving pin 67 upwardly to its normal position as shown in FIG. 1.

Conductor 56 to which the stationary contact 54 is connected extends out of upper housing part 48 and has a suitable external terminal (not shown) connected thereto for connection is the heating circuit. Another conductor, a part of which is shown at 74, is coupled to the movable contact 55 and extends outwardly through the upper housing part 48 with another external terminal (also not shown) being connected thereto for connection in the heating circuit. It will be readily seen that switch contacts 54, 55 together with conductors 56, 74 are disposed within the switch housing 48, 49 and that a prolonged, heavy current flow therethrough responsive to a heavy heating load will generate appreciable internal heat which will be sensed by the diaphragm 18, thereby causing premature actuating of armature 57 to open contacts 54, 55.

Compensation for this internal heating of diaphragm 18 is mechanically provided by disc 24 in conjunction with cam surfaces 28, 28', and 28" on the lever member 26. Disc 24 has an arm 75 extending radially therefrom with a portion 76 extending upwardly through arcuate slot 77 in the lever member 26. It will now be seen that manual rotation of disc 24 in one direction by means of the portion 76 of the arm 75 will through the cooperative engagement of projections 32, 32', and 32" and cam surfaces 28, 28', and 28" act against the top side 19 of the diaphragm 18 and force exerted by spring 22 thereby tending to depress the diaphragm. On the other hand, manual rotation of disc 24 in the opposite direction will through the aforesaid cooperative engagement of projections 32, 32', and 32" and cam surfaces 28, 28', and 28" permit corresponding raising of the diaphragm 18.

It will be understood that since disc 24 is carried by the lever member 26 which has the cam surfaces 28, 28', and 28" formed thereon, the action of disc 24 upon diaphragm 18 is independent of the action of cam 45. Thus, disc 24 may be preadjusted to provide the requisite compensation for internal heating due to load with adjustment of the control knob 42 thereafter acting on the diaphragm 18 in the usual manner through cam 45. Likewise, for any given setting of control knob 42 and cam 45, adjustment of disc 24 will act independently upon diaphragm 18 in essence to apply an additional biasing movement thereto to correct the calibration of the main control knob 42 to compensate for the internal heating.

From the foregoing description of one specific exemplification of our invention, it will be apparent that we have provided an improved arrangement for effectively dialing a preselected electrical load setting in a room thermostat or the like to compensate for internal heating due to current flow within the thermostat. An important advantage of the improved arrangement is that it is possible to achieve a more accurate calibration of the thermostat that matches the load to which it is connected.

While there have been described above the principles of this invention in connection with specific apparatus, it is to be clearly understood that this description is made only by way of example and not as a limitation to the scope of the invention.

What we claim as new and desire to secure by Letters Patent of the United States is as follows:

1. A thermostatic device comprising: switch means for opening and closing an electrical circuit and having circuit elements connected thereto, temperature responsive actuator means for actuating said switch means in response to a predetermined temperature, lever means in contact with said temperature responsive actuator means for selectively varying said predetermined temperature, a first manually operated means including cam means for acting upon said lever means, and a second manually operated means operably associated with said lever means for acting upon said lever means to compensate for heating of said actuator means due to current flow in said switching means and circuit elements, said second manually operated means independently settable of said first manually operated means.

2. The device of claim 1 wherein said lever means includes cam means therewith, and said second manually operated means includes cam actuating means for contacting said lever cam means.

3. A thermostatic device comprising: switch means for opening and closing an electrical circuit and having circuit elements connected thereto, temperature responsive actuator means for actuating said switch means in response to a predetermined temperature, a first manually operated means acting upon said actuating means for selectively varying said predetermined temperature and a second manually operated means acting upon said actuator means to compensate for heating of said actuator means due to current flow in said switching means and circuit elements, said second manually operated means independently settable of said first manually operated means, said actuator means including a temperature responsive diaphragm for actuating said switch means, and a temperature setting member, said first manually operated means comprising cam means acting on said member, and said second manually operated means comprising second cam means carried by said temperature setting member and acting on said diaphragm.

4. The device of claim 3 wherein said temperature setting member is a pivotally mounted lever, and further includes a spring means normally biasing said diaphragm, second cam means and pivotally mounted lever in one direction, said first cam means acting on said pivotally mounted lever against the bias of said spring means thereby selectively to adjust the position of said lever, second cam means and diaphragm, said second cam means acting on said diaphragm against the bias of said spring means thereby selectively to adjust the position of said diaphragm independently of the position of said pivotally mounted lever and first cam means.

5. The device of claim 3 wherein said second cam means comprises at least one coined cam surface on said temperature setting member, and a manually actuated element movably supported between said temperature setting member and diaphragm to cooperatively engage said coined cam surface and diaphragm.

6. A thermostatic device comprising: switch means for opening and closing an electrical circuit and having circuit elements connected thereto, temperature responsive actuator means for actuating said switch means in response to a predetermined temperature, a first manually operated means acting upon said actuating means for selectively varying said predetermined temperature and a second manually operated means acting upon said actuator means to compensate for heating of said actuator means due to current flow in said switching means and circuit elements, said second manually operated means independently settable of said first manually operated means, said actuator means comprising a temperature responsive diaphragm having opposite sides with one of said sides being operatively connected for actuation of said switch means, and a pivotally mounted lever member spaced from the other side of said diaphragm, said second manually operated means including at least one cam surface on the side of said lever member facing said other side of said diaphragm, and a manually actuated member mounted rotatably with respect to said lever member and cooperatively engaging said cam surface and said other side of said diaphragm, said first manually operated means including a manually actuated rotatable cam cooperatively engaging said lever member, and further including a spring means acting on said one side of said diaphragm and normally biasing said diaphragm, manually actuated member and lever member in one direction, said rotatable cam acting on said lever member against the bias of said spring means thereby selectively to adjust the position of said lever member, manually actuated member and diaphragm, and said manually actuated member acting on said diaphragm against the bias of said spring means thereby selectively to adjust the position of said diaphragm independently of the position of said lever member and rotatable cam.

7. The device of claim 6 wherein said one side of said diaphragm has a protuberance formed thereon, said manually actuated member having an upstanding cylindrical portion formed thereon rotatably seated on said protuberance, said lever member having an opening with said cylindrical portion seated therein for rotatable and axial movement, said cam surface being arcuate about the axis of said cylindrical portion, and said manually actuated member having a projection thereon cooperatively engaging said cam surface whereby rotation of said manually actuated member provides axial movement thereof thereby acting on said one side of said diaphragm against said spring means.

References Cited

UNITED STATES PATENTS

| 2,822,447 | 2/1958 | Garner | 200—140 |
| 3,121,151 | 2/1964 | Mitick | 200—140 |
| 3,214,538 | 10/1965 | Tyler | 200—139 |

BERNARD A. GILHEANY, *Primary Examiner.*

H. B. GILSON, *Assistant Examiner.*